(12) United States Patent
Pickutoski et al.

(10) Patent No.: US 7,906,194 B2
(45) Date of Patent: Mar. 15, 2011

(54) OPTICAL DISC WITH TEXTURED EDGE

(75) Inventors: Edward Pickutoski, Blakely, PA (US); Kenneth James Rinaldi, Madison Township, PA (US)

(73) Assignee: Cinram International Inc., Scarborough (CA)

( * ) Notice: Subject to any disclaimer, the term of this patent is extended or adjusted under 35 U.S.C. 154(b) by 535 days.

(21) Appl. No.: 11/095,903

(22) Filed: Mar. 31, 2005

(65) Prior Publication Data

US 2006/0222808 A1 Oct. 5, 2006

(51) Int. Cl.
*B32B 3/02* (2006.01)
(52) U.S. Cl. .............. 428/64.1; 428/64.4; 430/270.11; 264/1.33; 264/328.1; 425/544
(58) Field of Classification Search .............. 428/64.1, 428/64.4; 430/270.11
See application file for complete search history.

(56) References Cited

U.S. PATENT DOCUMENTS

| | | | |
|---|---|---|---|
| 4,710,913 A * | 12/1987 | Matsushima et al. ......... 369/280 |
| 4,741,689 A | 5/1988 | Onizawa et al. |
| 4,995,799 A | 2/1991 | Hayashi et al. |
| 5,388,803 A | 2/1995 | Baumgartner et al. |
| 5,766,359 A | 6/1998 | Sichmann et al. |
| 5,766,495 A | 6/1998 | Parette |
| 5,792,538 A | 8/1998 | Yurescko-Suhan |
| 5,863,328 A | 1/1999 | Sichmann et al. |
| 5,870,364 A | 2/1999 | Raczynski |
| 5,900,098 A | 5/1999 | Mueller et al. |
| 5,913,653 A | 6/1999 | Kempf |
| 5,932,042 A | 8/1999 | Gensel et al. |
| 5,932,051 A | 8/1999 | Mueller et al. |
| 5,935,673 A | 8/1999 | Mueller |
| 5,958,651 A | 9/1999 | Van Hoof et al. |
| 5,997,976 A * | 12/1999 | Mueller et al. ............... 428/64.1 |
| 6,238,764 B1 * | 5/2001 | Usami ......................... 428/64.1 |
| 6,261,403 B1 | 7/2001 | Gerigk et al. |
| 6,309,496 B1 | 10/2001 | Van Hoof |
| 6,309,727 B1 | 10/2001 | Mueller et al. |
| 6,354,827 B1 | 3/2002 | Kerfeld |
| 6,527,538 B1 | 3/2003 | Pickutoski et al. |
| 6,596,367 B2 | 7/2003 | Van Der Tempel |
| 6,780,564 B2 | 8/2004 | Lawandy et al. |
| 6,814,825 B2 | 11/2004 | Becker et al. |
| 7,011,877 B2 * | 3/2006 | Singer et al. ................. 428/64.1 |
| 7,325,287 B2 | 2/2008 | Sweeney |
| 7,419,045 B2 | 9/2008 | Kelsch |
| 7,535,806 B2 | 5/2009 | Fumanti |
| 7,564,771 B2 | 7/2009 | Sweeney |
| 2003/0102590 A1 | 6/2003 | Pickutoski et al. |
| 2006/0023598 A1 | 2/2006 | Babinski et al. |

(Continued)

OTHER PUBLICATIONS

"Plant Tour of How Compact Discs Are Made", pp. 1-4.

(Continued)

*Primary Examiner* — Elizabeth Mulvaney
(74) *Attorney, Agent, or Firm* — Cooper & Dunham LLP

(57) ABSTRACT

A method for producing optical discs is provided. A substrate for an optical disc is formed by utilizing a molding process. A textured surface is formed at an outer diameter edge of the substrate. A protective coating is applied to cover the textured surface at the outer diameter edge. The protective coating adheres securely to the textured surface at the outer diameter edge to prevent seepage of moisture into the optical disc through the outer diameter edge surface. Thus, an improved optical disc which avoids moisture-caused warpage, corrosion and/or oxidation can be formed.

19 Claims, 3 Drawing Sheets

U.S. PATENT DOCUMENTS

| | | |
|---|---|---|
| 2006/0101634 A1 | 5/2006 | Sweeney |
| 2006/0104190 A1 | 5/2006 | Babinski |
| 2006/0165419 A1 | 7/2006 | Musto |
| 2006/0181706 A1 | 8/2006 | Sweeney |
| 2006/0270080 A1 | 11/2006 | Rinaldi |
| 2006/0274617 A1 | 12/2006 | Musto et al. |
| 2007/0008861 A1 | 1/2007 | Fumanti |
| 2007/0014224 A1 | 1/2007 | Sweeney |
| 2007/0029167 A1 | 2/2007 | Kelsch |
| 2007/0090006 A1 | 4/2007 | Kelsch |
| 2007/0098947 A1 | 5/2007 | Mueller |

OTHER PUBLICATIONS

"DVD in Detail", pp. 1-35.

U.S. Appl. No. 11/705,682, filed Feb. 13, 2007.

U.S. Appl. No. 11/715,249, filed Mar. 6, 2007.

U.S. Appl. No. 11/726,968, filed Mar. 22, 2007.

U.S. Appl. No. 11/705,682, filed Feb. 13, 2007 of Michael Parette.

U.S. Appl. No. 11/715,249, filed Mar. 6, 2007 of William R. Mueller et al.

U.S. Appl. No. 11/726,968, filed Mar. 22, 2007 of Lewis Gensel et al.

U.S. Appl. No. 11/936,625, filed Nov. 7, 2007 of Petrus Hubertus Van Hoof et al.

U.S. Appl. No. 11/938,572, filed Nov. 12, 2007 of Dominick A. Dallaverde et al.

U.S. Appl. No. 12/126,667, filed May 23, 2008 of Ed Pickutoski.

* cited by examiner

OPTICAL DISC WITH TEXTURED EDGE

TECHNICAL FIELD

This application relates to methods, apparatuses and systems for manufacturing optical storage media. In particular, the application relates to techniques for avoiding moisture-caused warpage, corrosion and oxidation of optical discs.

DESCRIPTION OF RELATED ART

Use of CDs (compact discs) and DVDs (digital versatile discs or digital video discs) as optical storage media ("optical disc") for storing and transporting content (such as audio, video, graphics, computer software, etc.) in an optically readable manner has been popular for a number of years. Several formats of optical discs are currently available, including (A) read-only formats such as CD-DA (digital audio compact disc), CD-ROM (CD-read-only memory), DVD-ROM, and other formats wherein content is prerecorded on the disc (such as by using an injection molding process), and (B) recordable formats in the form of (i) write-once read-many times formats such as CD-R (CD-recordable), and DVD-R (DVD-recordable), etc., or (ii) rewritable formats such as CD-RW (CD-rewriteable), DVD-RAM (DVD-Random Access Media), DVD-RW or DVD+RW (DVD-rewriteable), PD (Phase change Dual disk) and other phase change optical discs. Optical disc players for these optical discs use a red laser. Optical discs using a blue laser have also been introduced, such as HD DVD and BD (each of which includes read-only, recordable and rewritable formats). In addition, hybrid optical media which include a combination of formats are also available.

In conventional read-only type optical discs (for example, CD-ROM, DVD-ROM, etc.), data is generally stored as a series of "pits" embossed in a plane of "lands". Microscopic pits formed in a surface of a plastic medium [for example, polycarbonate or polymethyl methacrylate (PMMA)] are arranged in tracks, conventionally spaced radially from the center hub in a spiral track originating at the medium center hub and ending toward the medium's outer rim. The light reflected from a read-only medium's surface by an optical disc player or reader varies according to the presence or absence of pits along the information track. A photodetector and other electronics inside the optical disc player translate the signal from the transition points between these pits and lands caused by this variation into the 0s and 1s of the digital code representing the stored information.

Read-only type optical discs generally are produced by an injection molding process. Initially, data representing the content to be recorded, encoded as a run length limited digital code (commonly known as an EFM signal in CD manufacturing) which contains its digital information in the timing between transitions, is used to control a laser beam recorder to form pits in a photoresist or a dye-polymer layer on an optical grade glass disc known as a glass master. A metallized glass master is used in an electroforming process to form (typically, metal) stampers. A stamper is used on one side of an injection molding cavity to emboss an information layer of pits and lands on a transparent polymer substrate formed by injection molding. The information bearing surface of the substrate is then covered with a reflective film or the like. In the case of a CD, a plastic protective coating is applied over the film, and then art (for example, a picture, a design, text, etc.) is typically printed on the upper surface of the disc, to form an end product. In the case of DVDs, two half-thickness substrates are typically formed, metallization is applied to one (for example, DVD-5) or both (for example, DVD-10, DVD-9, DVD-18) half-thickness substrates, and the two half-thickness substrates are bonded by an adhesive (for example, hot-melt adhesive, ultraviolet adhesive, etc.). A second information layer can be formed for a DVD (for example, DVD-18) by applying a photo-polymer coating over a metallization layer applied to a substrate and the second information layer is embossed by a stamper into the photo-polymer layer which is then UV cured, metalized and protective coated.

Recordable type optical media typically include a spiral wobble groove in the substrate. The groove defines recording channels on the disc for recording data, provides information for tracking of the disc while writing or reading data, and has its wobble frequency modulated to contain addressing and other information for the write and read processes. The substrate (including information layer bearing the spiral wobble groove) can be formed by injection molding, using a stamper electroformed with a glass master. In addition, recordable-type optical media generally include a recording layer. Information is recorded in the recordable-type optical medium by directing a laser light beam modulated by signals to selectively change optical characteristics (reflectivity or extinction coefficient) of the recording layer. The recording layer in write-once read-many times optical media typically includes a photosensitive organic dye which is heated during recording to irreversibly to form a pattern of marks or pits into the recording layer.

Each recording side of a rewritable disc also uses multiple layers beginning with a polycarbonate plastic substrate containing a shallow spiral groove extending from the inside to the outside diameter of the disc. A DVD-RW disc may additionally include pits and lands and a DVD-RAM disc also inside the groove itself (land and groove). The substrates (including information layer bearing the spiral groove, land pre-pits and embossed areas) may be formed by injection molding, using a stamper electroformed with a glass master. Next in the multiple layers of a rewritable disc typically comes a dielectric layer, followed by a phase-change type recording layer having a polycrystalline structure, another dielectric layer and a metal reflective layer. Additional layers may also be incorporated above or below the dielectric layer, with a protective coating being applied as a last layer. During recording of the rewritable optical medium, the laser selectively heats tiny areas of the recording track to change the phase of each heated area from more crystalline into less crystalline (also known as "amorphous") phase, in order to create marks that can be called "pits". During erase, the laser (in a process called "annealing") changes the amorphous areas back into more crystalline areas.

Various types of hybrid optical media are available. For example, one type of hybrid media has data pit patterns prerecorded on a surface of a substrate and has in addition a recording layer allowing a user to record data to the recording layer. Further, optical recording media having multiple recording layers are now also available. In addition, in another hybrid optical recording disc a read-only area and a recordable area are present on one side of the hybrid optical disc, with a wobble groove in the read-only area modulated by depressions in the substrate and extending into the substrate in the recordable area.

Conventionally produced optical discs are susceptible to warpage, and/or corrosion or oxidation of the reflective layer (for example, Al or Ag), caused by fluctuations of humidity in the environment in which the discs are used or stored. Absorption or desorption of moisture leads to differences in water concentration, thereby causing volume-change differences of the substrate which in turn cause warpage of the substrate. An optical disc having such a warped substrate may be unreadable. It has been proposed to include one or more moisture-proof layers in optical discs to prevent moisture-caused warpage and corrosion of the metal layer. However, such moisture-proof layers merely obstruct penetration of moisture from above and/or below the disc.

Moisture can also seep into the disc through the edge of the disc, in particular when the protective coating is imperfectly applied to the edge. Thus, such imperfections can lead to warpage, as well as to corrosion and oxidation of the internal layer(s) of the disc. There is a need for improved methodologies which moisture-proof and/or otherwise protect optical discs.

SUMMARY

This application provides methodologies and apparatuses for producing optical discs which can avoid moisture-caused warpage and/or other damage such as corrosion and oxidation.

A method for producing optical discs, in one embodiment, includes (a) forming a substrate for an optical disc by utilizing a molding process, wherein a textured substrate surface at an outer diameter edge of the substrate is formed, and (b) applying a protective coating to cover the textured surface at the outer diameter edge. The protective coating may be formed by a portion of spin-coated lacquer which flows over the outer diameter edge, such as in CD manufacturing. As another example (such as in the case of DVD or HD), an adhesive may be applied to bend two substrates, with a portion of the adhesive extruding out from between the substrates to form the protective coating over the textured substrate surface. In any event, the textured substrate surface improves adhesion of the protective coating. The protective coating adheres securely to the textured surface at the outer diameter edge to prevent seepage of moisture into the optical disc through the outer diameter edge surface and/or other damage such as, without limitation, oxidation.

An apparatus for forming optical discs, in one embodiment, comprises (i) a molding element for forming a substrate for an optical disc, the molding element including a textured surface for forming a side surface of the substrate at an edge of the substrate, and (ii) a coating device for applying a coating substance to cover the side surface of the substrate at the outer diameter edge. The side surface of the substrate formed by the textured surface of the molding element is textured, and a portion of the coating substance attaches to the textured disc surface.

An improved optical disc which avoids moisture-caused warpage and/or other damage, such as corrosion and/or oxidation, in one embodiment, comprises (i) a substrate including a textured surface at an outer diameter edge of the substrate, and (ii) a protective coating covering the textured surface at the outer diameter edge of the substrate. The improved optical disc can be read-only type disc, a recordable disc, a rewritable disc or a hybrid disc.

BRIEF DESCRIPTION OF THE DRAWINGS

The features of the present application can be more readily understood from the following detailed description with reference to the accompanying drawings wherein.

DETAILED DESCRIPTION

This disclosure describes improvements to methodologies and apparatuses for producing optical discs which can avoid moisture-caused warpage, corrosion and/or oxidation.

Figure 1:
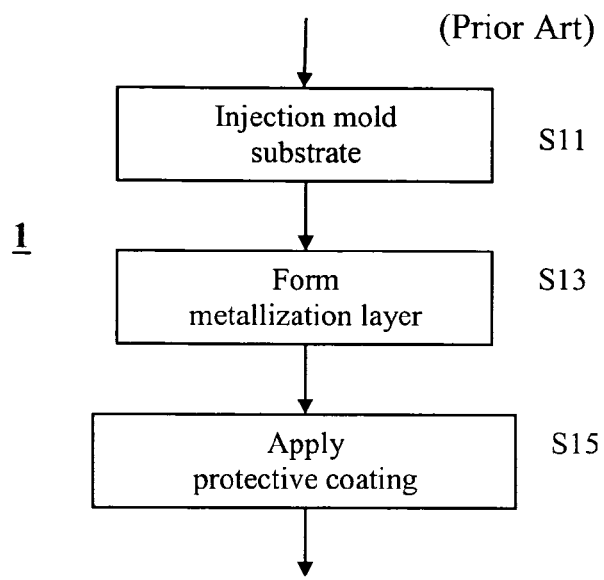
FIG. 1 shows a flow chart of a conventional optical disc manufacturing method.

A method 1 for producing an optical disc will be described with reference to FIG. 1. A substrate is injection molded to have an information layer in the form of pits and lands (step S11). The information layer is then sputtered with a reflective metal (for example, aluminum, gold, silver, Ag alloy, etc.) coating (step S13). A protective coating is applied to the side of the disc (step S15). In the case of a CD, the protective coating is typically applied by spin coating a layer of lacquer on top of the sputtered surface and then curing the lacquer to harden it.

In the case of a DVD disc, two half-thickness substrates are bonded together with an adhesive, with some of the adhesive extruding from between the substrates to cover the side of the disc as a protective coating. If the DVD is to have only a single information layer, then the second substrate may be a blank (i.e. does not include an information layer bearing pits and lands or metallization). If the DVD is to have two information layers, two single-layer substrates may be bonded together. If reading is to take place from only one side, one of the reflective layers is less reflective. If reading is to take place from both sides, then both reflective layers can be equally reflective.

Methodologies and apparatuses which can be used in an optical disc manufacturing process are discussed in U.S. Pat. Nos. 4,995,799, 5,766,495, 5,792,538, 5,863,328, 5,900,098, 5,913,653, 5,932,042, 5,932,051, 5,932,058, 5,935,673, 5,949,752, 5,958,651, 5,995,481, 5,997,976, 6,117,284, 6,124,011, 6,160,787, 6,309,496, 6,309,727, 6,361,845, 6,440,248, 6,527,538, which are incorporated by reference herein in their entireties. Additional apparatuses and techniques are discussed in U.S. Pat. Nos. 5,766,359, 5,863,328, 6,261,403 and 6,814,825, which are also incorporated by reference herein in their entireties.

A system 10 for producing optical discs will be described with reference to FIG. 2. The system 10 is an-line system for producing double-surfaced optical discs (such as a DVD or HD disc). Each double-surfaced optical disc has an upper surface (which may be information bearing or not) and a lower information bearing surface and with each information bearing surface being formed by injection molding a polycarbonate plastic surface having a pattern of pits and lands and by coating the pits and lands with a metallic reflective coating.

In the system 10 an injection molding station 11 injects a molten transparent polycarbonate plastic into a mold cavity, having a stamper on one face to produce a clear plastic disc with pits impressed on one side. The molded plastic disc is placed by a robotic arm 12a in a carousel 17 which rotates to bring the disc to the metallization station 13 where the disc is lifted by a robotic arm 12b and brought into the metallization station, coated upon the pitted surface of the disc with a reflective metal layer 9 and returned to the carousel 17. Where the surface is not information bearing it would not require a metallization step. The half disc travels upon disc transport belts 15 during which time it cools somewhat. The corresponding upper disc half waits upon a spindle (not shown) for assembly. The lower disc half is moved by a robotic arm (not shown) from the transport belt 15 to a rotation station 23. A fluid dispensing arm 19 places a ring of an ultra-violet curable adhesive on the lower half disc as it is slowly rotated through a full rotation on a spacer chuck. A robotic arm (not shown) then removes the upper half disc from the spindle and places it upon the spacer chuck, so that it does not contact the adhesive.

Figure 2:
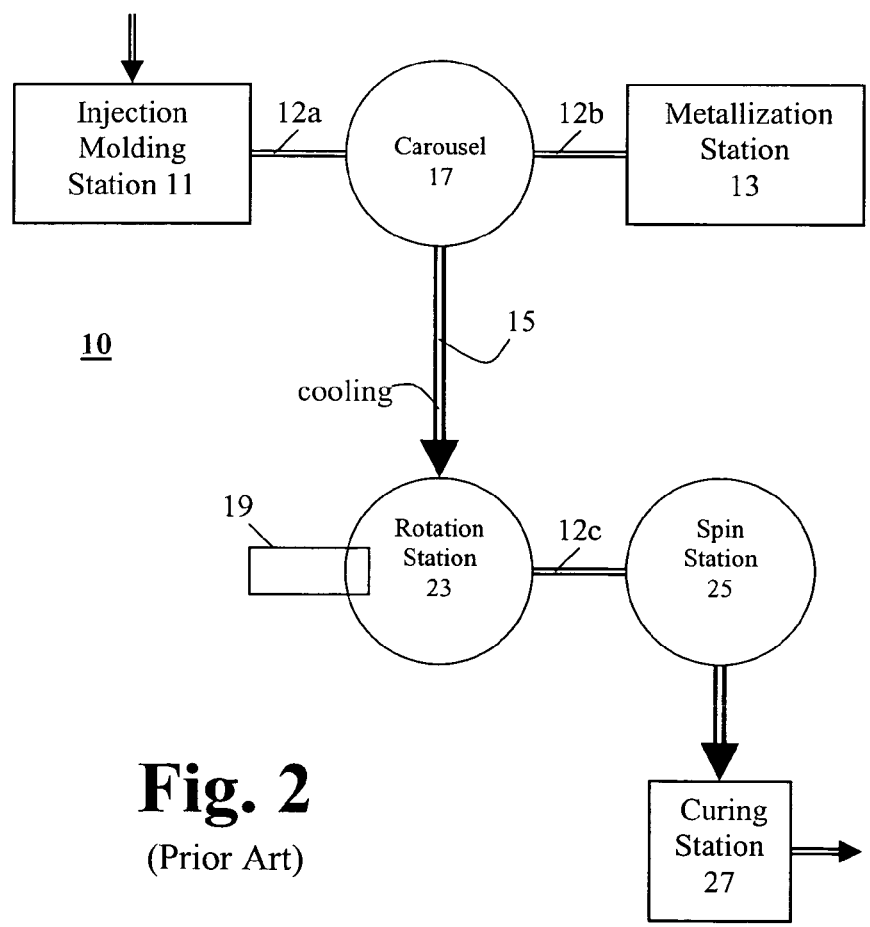
FIG. 2 shows a schematic diagram of a conventional optical disc producing system.

In the case of a process for manufacturing optical discs in which only one surface is information bearing, only a single injection molding station 11 and a single metallization station 13 (such as shown in FIG. 2) are needed to be included. On the other hand, in a process for manufacturing optical discs in which both surfaces are information bearing, two injection molding stations and two metallization stations (not shown) would typically be included, and a transport mechanism brings the two half-discs to an assembly area where adhesive is applied to one of the discs.

Next, the pair of discs is lifted by a robotic arm 12c to a spin station 25 where the upper surface comes into contact with the adhesive and the sandwich of discs and adhesive is rapidly spun to spread the adhesive. Some adhesive will typically extrude from between the sandwich of discs and cover the sides of the discs, acting as a protective coating.

The composite is then transported to a curing station 27 where the composite is exposed to ultra-violet light of low intensity adjusted so that primarily the inner and outer circumferences of the disc halves are bonded. If the disc has a metallization layer that does not extend to either the internal or external radii of the disc, it is sufficient to bathe the entire disc in ultra-violet radiation and rely mainly upon the shielding by the metallization layer to effect the tacking of the surfaces together at their inner and outer circumferences. The composite is exposed to sufficient ultra-violet light to cure the adhesive.

Conventional optical disc manufacturing systems, apparatuses and methodologies may not provide adequate adhesion of the protective coating (or adhesive) along the disc edge at the outer diameter. The protective coating on conventionally made optical discs can peel along the disc edge, especially if the disc is exposed to extreme environmental conditions. Conventional systems and methodologies may be adapted in accordance with this disclosure to improve adhesion of the protective coating (or adhesive) along the outside edge of the disc, in order to overcome peeling and other problems.

The above-mentioned method 1 and system 10 are merely one conventional method and one conventional system, respectively, amongst many conventional methods and conventional systems which can be modified according to the present disclosure. For example, other conventional methodologies and systems for manufacturing read-only type optical media using injection molding (or other molding techniques) can also be adapted according to this disclosure. This disclosure is not limited to production of read-only type optical discs. Methodologies and systems for making recordable, rewritable and/or hybrid optical media utilizing a molding technique can also be modified to obtain the benefits of this disclosure.

An improvement to the method for producing an optical disc includes using an improved molding cavity for forming the substrate which causes the substrate to have a textured edge. When a protective coating applied by spin coating flows over the outer diameter edge of the disc, the protective coating adheres to the textured edge surface. The textured edge surface provides superior adhesion of the protective coating to the disc, and inhibits moisture absorption and oxidation.

The term "textured" is used to specify a characteristic of a surface having a texture of No. 3 or higher according to the SPI-SPE (Society of Plastic Industry and Society of Plastic Engineers) standard. Preferably, a textured surface has a texture of No. 5 or higher according to the SPI-SPE.

Texturing has been applied in molding parts for assorted purposes. For example, textured surfaces are used on plastic panels for automobile and appliances (see U.S. Pat. No. 5,388,803, the entire contents of which are incorporated by reference herein).

In addition, texturing also has been applied in optical disc technology for assorted purposes. For example, texturing may be used to mask manufacturing irregularities and/or facilitate application of artwork or labeling thereto, and thereby improve appearance of the optical disc. Use of texturing in optical disc technology is discussed in U.S. Pat. Nos. 5,870,364, 5,958,651, 5,997,976, 6,354,827 and 6,780,564, which are incorporated by reference herein in their entireties.

However, no teachings or suggestions to improve protective coating adhesion at an outer edge surface of an optical disc by applying a texturing in optical disc manufacturing to form a textured surface at the outer diameter edge of the optical disc have been found in the prior art.

Figure 3A:
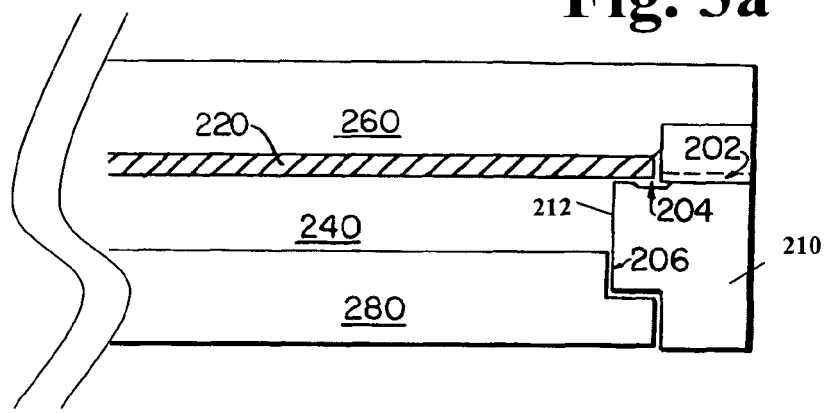
FIG. 3a shows a schematic diagram of a molding element, according to one exemplary embodiment of this application, for injection molding a substrate with an information layer embossed by a stamper.

An injection mold which can be used in an injection molding station will be discussed with reference to FIG. 3a (not drawn to scale). A molding element 200 includes a disc-shaped cavity 240 sandwiched between a stamper 220, stamper outer holder ring 210, a top plate 260, and a bottom plate 280. The stamper outer holder ring 210 includes a textured surface 212 (in contrast, in a conventional molding element a surface which corresponds to the surface 212 in the molding element 200 is typically polished). A moldable material 250 such as a polycarbonate-based thermoplastic is commonly used to form the disc substrate. Moldable material is liquified by heating to a temperature sufficient to permit uniform flow into the disc-shaped cavity 240 from the center of the mold (on the left in FIG. 3a) radially out in all directions to completely fill cavity 240. In order to release residual materials and prevent interference with the disc substrate, a variety of specially configured gaps or vents 202, 204, 206 may be provided in the injection mold 200. Gap or vent 206 is a "parting line" of the mold (i.e., the line along which bottom plate 280 separates from the remainder of the mold to allow each successive disc produced in the mold to be removed from the mold).

Figure 3C:
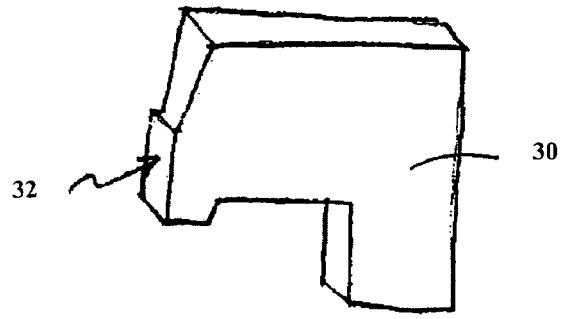
FIG. 3c shows a cutaway view of a stamper outer retaining ring of a molding element configured with a textured surface, according to another exemplary embodiment.
Figure 3B:
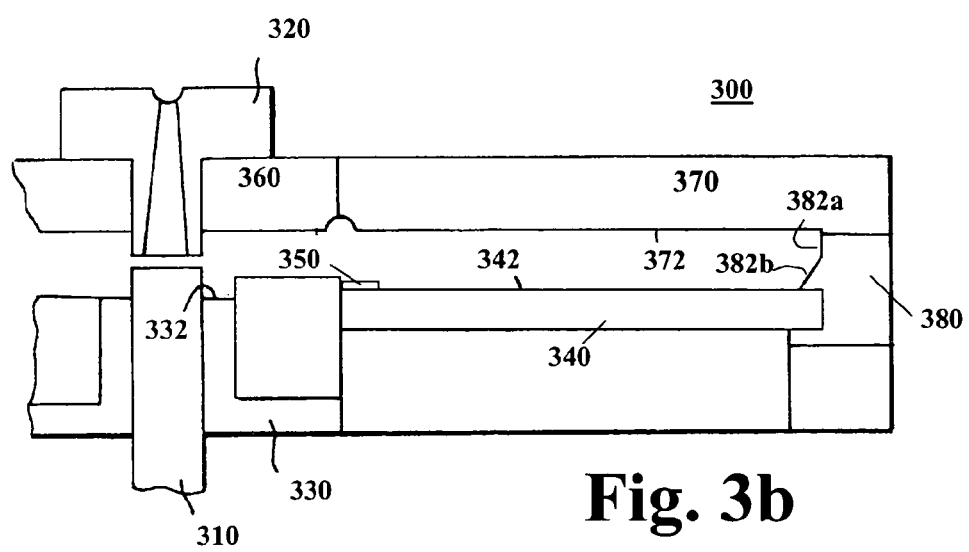
FIG. 3b shows a schematic diagram of a molding element according to another exemplary embodiment.

A molding element according to another embodiment will be discussed below with reference to FIG. 3b (not drawn to scale). A molding element 300 may include a variety of components, including axially located punch 310 and sprue bushing 320. Stationary bushing 330, stamper 340, stamper inner holder ring 350, female bushing 360, mirror block 370, and stamper outer holder ring 380 are all mounted around punch 310 and bushing 320. Stamper surface 342 of stamper 340, surfaces 382a and 382b of the stamper outer holder ring 380, and block surface 372 of block 370 are some of the surfaces in contact with molten plastic during molding that forms the optical disc. The counterparts, in a conventional molding element, to the surfaces 382a and 382b are polished surfaces. The molding element 300 can be adapted with the techniques of this application by applying texture to the surfaces 382a and 382b of the stamper outer holder ring 380. When the surfaces 382a and 382b are textured, a substrate formed with the molding element will have a textured edge at the outer diameter of the substrate.

Figure 4:
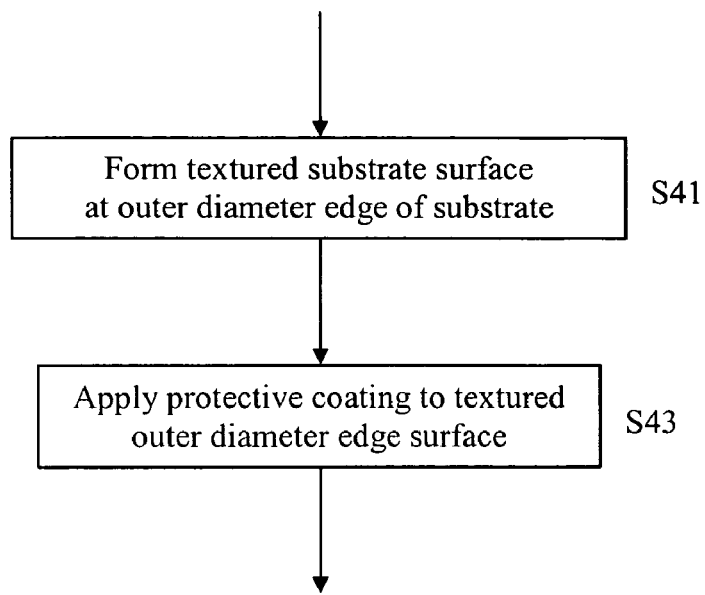
FIG. 4 shows a method for forming optical discs, in accordance with one embodiment of the present application.

A method for producing optical discs, according to an embodiment of this disclosure, will be described with reference to FIG. 4. A substrate for an optical disc is formed by utilizing a molding process, whereby a textured substrate surface at an outer diameter edge of the substrate is formed. (step S41). The substrate is preferably injection molded with an information layer embossed on the substrate utilizing a stamper. A protective coating is applied to cover the textured outer diameter surface (step S43).

Thus, improved optical media which avoid moisture-caused warpage, corrosion and/or oxidation can be formed by utilizing an improved molding element for forming a substrate for the optical disc. The molding element includes a textured surface (for example, the surface 212 of the stamper outer holder ring 210 in FIG. 3a, the surfaces 382a and 382b of the stamper outer holder ring 380 in FIG. 3b, or the surface 32 of the stamper outer holder ring 30 in FIG. 3c) for forming a side surface of the substrate at an outer diameter edge of the substrate. The side surface of the substrate formed by the textured surface of the molding element is textured, and when a coating substance (for example, lacquer or adhesive) is applied by a coating device to the optical disc, a portion of the coating substance adheres securely to the textured disc surface. Plural surfaces may be formed at the outer diameter edge of the substrate. For example, the mold 300 in FIG. 3 includes multiple textured surfaces 382a and 382b.

Figure 5A:
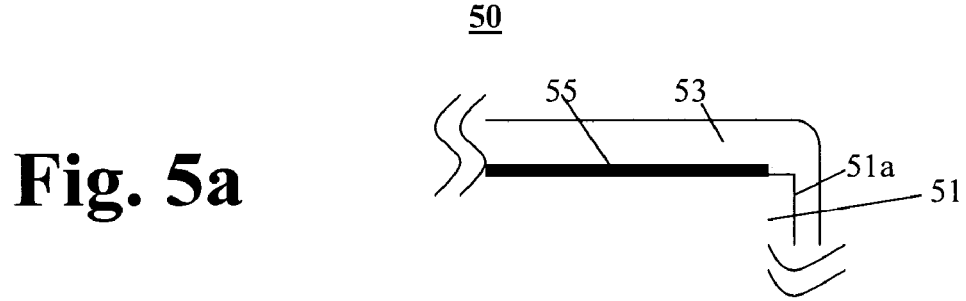
FIG. 5a shows a partial view of a disc including substrate, a textured side surface and a protective coating adhering securely to the textured side surface, according to one exemplary embodiment.

In one exemplary embodiment (FIG. 5a), an improved optical disc 50 includes (i) a substrate 51 having a textured surface 51a at an outer diameter edge of the substrate, and (ii) a protective coating 53 covering the optical disc, including the textured surface at the outer diameter edge of the substrate. The improved optical media can include read-only type optical discs, recordable optical discs, rewritable optical discs, hybrid optical discs, etc. In the case of recordable discs, rewritable discs and hybrid discs, one or more additional layers 55 (such as a metallization layer) typically are interposed between the substrate and the protective coating, with the substrate being substantially thicker than the additional layers (individually and collectively).

Figure 5B:
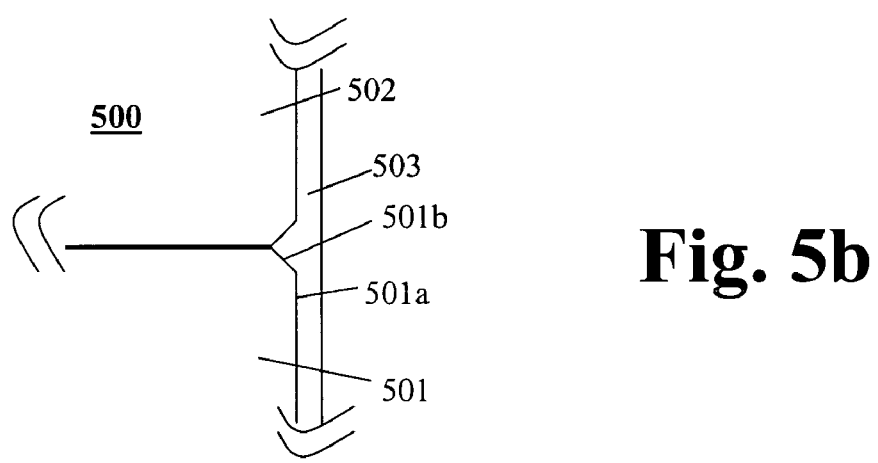
FIG. 5b shows a partial view of a disc, according to another exemplary embodiment, including two substrates bonded together by an adhesive, each substrate having plural textured side surfaces and a protective coating covering the textured side surfaces formed by adhesive which extruded from between the two substrates.

According to another exemplary embodiment (FIG. 5b), an improved disc 500 includes substrates 501 and 502 bonded together by an adhesive. Each substrate has plural textured side surfaces (see, or example, surfaces 501a and 501b of substrate 501). A protective coating 503 which covers the textured side surfaces is formed by adhesive which extruded from between the substrates 501 and 502.

Optical discs produced by conventional methodologies and apparatuses may experience seepage of moisture at an inner diameter edge. To obviate such problems, the substrate of the improved optical disc may optionally include a textured inner diameter surface at an inner diameter edge of the substrate.

Environmental testing of fifty discs made with textured edge as well as fifty discs without textured edge were conducted at 80° C. and 85% relative humidity for ninety-six continuous hours (that is, four days). The environmental testing demonstrated that under severe conditions or in harsh environments, discs without textured edge experienced edge flaking (or peeling) and blistering of the protective lacquer. Nine (that is, 18%) of the fifty discs without textured edge experienced edge and surface adhesion problems, major flaking and evidence of corrosion. In contrast, three (that is, 6%) of the fifty discs with textured edge exhibited minor adhesion or flaking problems, and no corrosion problems. Thus, the techniques of this application were demonstrated experimentally to be effective to reduce the occurrence of nonadhesion of the protective coating, moisture seepage, corrosion, oxidation, etc.

The above specific embodiments are illustrative, and many variations can be introduced on these embodiments without departing from the spirit of the disclosure or from the scope of the appended claims. For example, elements and/or features of different illustrative embodiments may be combined with each other and/or substituted for each other within the scope of this disclosure and appended claims.

What is claimed is:

1. A method for producing discs, the method comprising:
    (a) forming a substrate for an optical disc by utilizing a molding process along with a separable molding element and a textured molding element, wherein a side surface of the substrate formed at an outer diameter edge of the substrate is textured;
    (b) separating said separable molding element from the textured molding element in a separation direction to allow removal of the substrate from the textured molding element; and
    (c) applying a protective coating over the textured side surface of the substrate, by applying a lacquer to the substrate, flowing a portion of said lacquer over the textured side surface and curing the lacquer, wherein
    said textured side surface has a texture of No. 3 or higher according to the SPI-SPE standard and
    said textured side surface is formed by a textured surface of the textured molding element oriented along the separation direction and having a texture of No. 3 or higher according to the SPI-SPE standard.

2. The method of claim 1, wherein the protective coating adheres securely to the textured side surface at the outer diameter edge to prevent seepage of moisture into the optical disc through the outer diameter edge surface.

3. The method of claim 1, wherein step (a) comprises forming two or more textured side surfaces at the outer diameter edge of the substrate, and the protective coating adheres to the two or more textured substrate surfaces at the outer diameter edge.

4. The method of claim 1, wherein the lacquer is applied to the substrate by spin coating.

5. The method of claim 1, further comprising applying an adhesive to bond two substrates, wherein a portion of the adhesive extrudes out from between the substrates to form the protective coating over the textured side surface in step (c).

6. The method of claim 1, wherein the method is applied in a process for manufacturing read-only type optical discs.

7. The method of claim 1, wherein the method is applied in a process for manufacturing recordable optical discs.

8. The method of claim 1, wherein the method is applied in a process for manufacturing rewritable optical discs.

9. The method of claim 1, wherein the method is applied in a process for manufacturing hybrid optical discs.

10. The method of claim 1, wherein the molding process utilized in step (a) includes injection molding the substrate with an information layer embossed on the substrate utilizing a stamper.

11. An apparatus for forming optical discs, the apparatus comprising:
- a textured molding element for forming a substrate for an optical disc, the textured molding element including a textured surface for forming a side surface of the substrate at an outer diameter edge of the substrate;
- a separable molding element configured to separate from said textured molding element in a separation direction to allow removal of said substrate from said textured molding element; and
- a coating device for applying a coating substance to the optical disc,
- wherein the side surface of the substrate formed by the textured surface of the textured molding element is also textured, and a portion of the coating substance attaches to the textured side surface of the substrate, and
- wherein said textured side surface of the substrate and said textured surface of the textured molding element have a texture of No. 3 or higher according to the SPI-SPE standard and
- at least a portion of said textured surface of said textured molding element is oriented along said separation direction.

12. The apparatus of claim 11, wherein the textured side surface of the substrate at the outer diameter edge has a texture whereby the protective coating adheres securely to the textured surface at the outer diameter edge to prevent seepage of moisture into the optical disc through the outer diameter edge surface.

13. The apparatus of claim 11, wherein the molding element forms two or more textured side surfaces at the outer diameter edge, and the protective coating adheres to the two or more textured substrate side surfaces.

14. The apparatus of claim 11, wherein said coating device spin coats a lacquer over the substrate, and a portion of the lacquer flows over the outer diameter edge to form the protective coating over the textured substrate surface.

15. The apparatus of claim 11, wherein said coating device applies an adhesive to bond two substrates, and a portion of the adhesive extrudes out from between the substrates to form the protective coating over the textured substrate surface.

16. A system for manufacturing prerecorded optical discs including the apparatus of claim 11.

17. A system for manufacturing recordable optical discs including the apparatus of claim 11.

18. A system for manufacturing rewritable optical discs including the apparatus of claim 11.

19. A system for manufacturing hybrid optical discs including the apparatus of claim 11.

* * * * *